Dec. 25, 1956    R. L. EARLY    2,775,226
COMBINED CONTAINER AND FEEDER
Filed Aug. 2, 1955
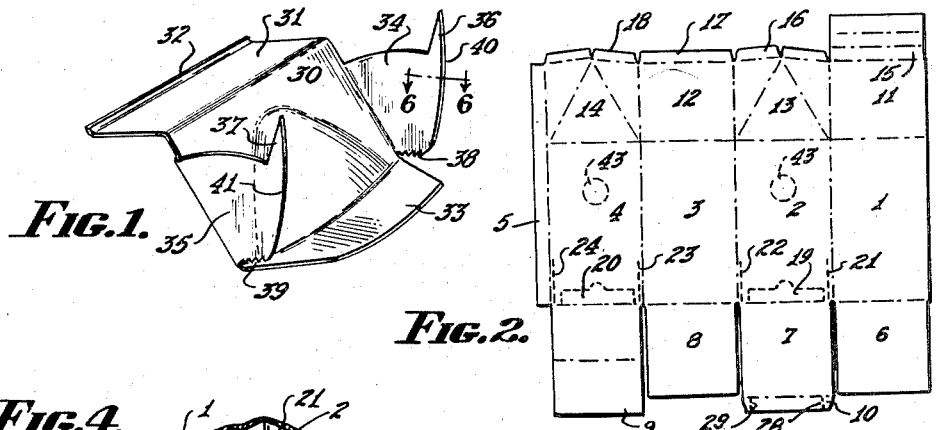
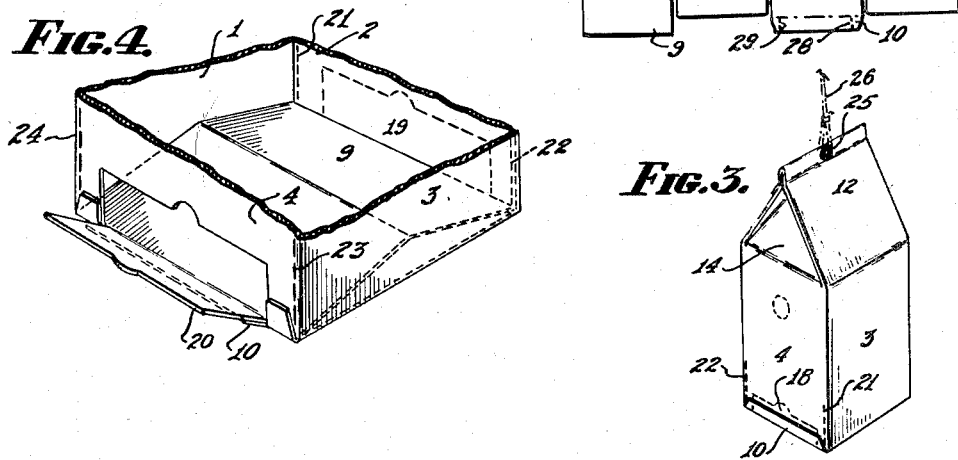
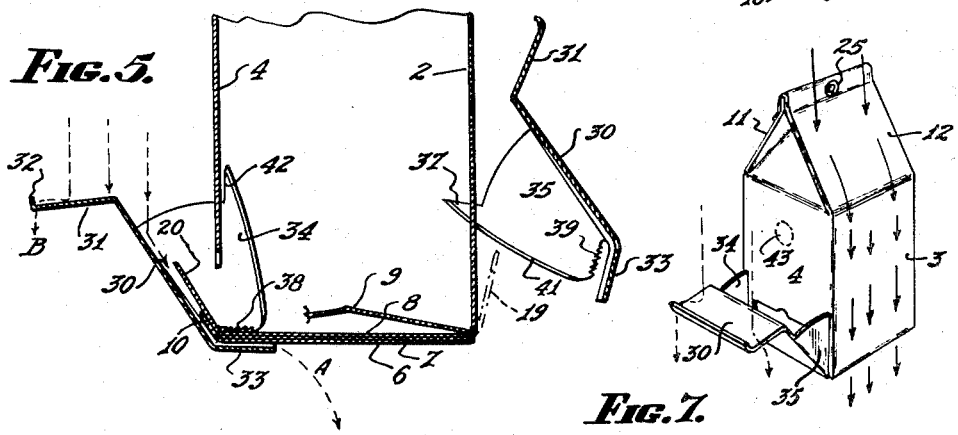
INVENTOR.
ROBERT LEE EARLY,
BY Allen & Allen
ATTORNEYS.

United States Patent Office 2,775,226
Patented Dec. 25, 1956

2,775,226
COMBINED CONTAINER AND FEEDER

Robert Lee Early, Cincinnati, Ohio, assignor to The Early and Daniel Company, Cincinnati, Ohio, a corporation of Ohio Application August 2, 1955, Serial No. 526,017

8 Claims. (Cl. 119—52)

This invention has to do with a package or container in which feed or grain can be sold in retail stores and the container converted by the purchaser into a bird feeder which may be hung from a tree or the like.

It is a principal object of my invention to provide a paperboard container for feed or grain which may be readily converted into a self-filling feeder by means of a pair of trough forming attachments which may be readily associated with the container adjacent the bottom end thereof.

A further object of my invention is the provision of improved trough forming attachments for converting a paperboard container into a bird feeder, the attachments being so constructed and arranged as to be readily engaged with the container and once engaged to remain securely attached thereto until the container is emptied, whereupon the attachments may be removed and associated with another filled container.

Still a further object of my invention is the provision of a bird feeder having feeding troughs and a gable roof, the position of the gable roof being such that rain water striking the roof will be diverted away from the feed troughs.

Yet a further object of my invention is the provision of feed troughs for a bird feeder in which the troughs are constructed to permit water collected therein to drain off without losing the feed contained therein.

These and other objects of my invention which will appear hereinafter or which will be apparent to the skilled worker in the art upon reading these specifications, I accomplish by that construction and arrangement of parts of which I shall now describe an exemplary embodiment.

Reference is now made to the accompanying drawings wherein:

Figure 1 is an enlarged perspective view of a trough attachment in accordance with my invention.

Figure 2 is a plan view of a blank for forming a combined container and feeder.

Figure 3 is a perspective view of the container-feeder of Figure 2 in erected condition.

Figure 4 is an enlarged partial perspective view illustrating the bottom portion of the erected feeder.

Figure 5 is a partial vertical sectional view illustrating the association of the trough attachments with the container body.

Figure 6 is a sectional view taken along the line 6—6 of Figure 1 illustrating the puncturing edge of the feeding attachment.

Figure 7 is a perspective view of the feed container with the trough attachment in operative position.

Referring first to Figure 2 of the drawings, I have therein illustrated a blank for forming a container in accordance with my invention. The blank will be preferably formed from paperboard suitably cut and scored to provide main body walls 1, 2, 3 and 4 and a glue flap 5 all in articulation in the order named. Bottom closure flaps 6, 7 and 8 are articulated to the bottom edges of the body walls 1—3, respectively, and the body wall 4 is provided at its bottom with a medially scored flap 9 adapted to form an inclined false bottom for the container. Closure flap 7 is provided with an attachment flange 10.

At their upper ends the body walls 1 and 3 are provided with roof forming panels 11 and 12 and the body walls 2 and 4 with diagonally scored gable forming panels 13 and 14. Suitable top securing flanges 13—16 complete the blank. Elongated tear out tabs 19 and 20 are provided at the lower ends of the body walls 2 and 4; and pairs of vertically disposed lines of perforation 21, 22 and 23, 24 are provided adjacent the ends of the tear out tabs in the manner illustrated.

When assembled the blank will form the container structure illustrated in Figure 3 which may be conveniently filled with feed or grain prior to the infolding of the roof and gable members. Upon being assembled an eyelet 25 may be employed to secure together the top securing flanges, the eyelet additionally serving as a convenient means through which a cord or string 26 may be passed for suspending the container from a branch or the like when in use as a feeder.

As best seen in Figure 4 the medially scored bottom forming flap 9 will provide outwardly and downwardly inclined bottom sections tending to direct the feed or grain toward the openings defined by the tear out tabs 19 and 20. Since in the assembled structure the attachment flange 10 will overlie and be secured to the tear out tab 18, I prefer to provide lines for severance 28 and 29 (Figure 2) in the attachment flange 10, the lines for severance coinciding with the end edges of the tear out. Thus when the tear out 20 is displaced from the plane of the body wall 4, as seen in Figure 4, the attachment flange 10 will break away with it.

It is to be understood, however, that the configuration of the blank illustrated is exemplary only and other forms and styles of blanks may be employed. Since it is intended that the container will be used outdoors it will be formed from a water-proofed paperboard or otherwise suitably proofed, as by wax dipping or spraying.

Figure 1 illustrates a trough attachment for converting my container into a feeder. The attachment will be preferably formed from metal or plastic and will comprise a main wall 30 terminating upwardly in an outwardly turned perch 31 having a flanged outer edge 32. At its bottom end the main wall 30 is provided with an inturned ledge 33 adapted to underlie the bottom of the container. At its ends the main wall is provided with extensions 34 and 35 having upwardly projecting points 36 and 37. The lower edges of the extensions are provided with teeth or serrations 38, 39 which are adapted to enter into gripping engagement with the bottom closure of the container. The forward edges 40 and 41 of the extensions will be formed as knife edges, as best seen in Figure 6, so as to provide a perforating edge to assist during the insertion of the trough into the container.

In use, the trough attachments are adapted to be associated with the container by first inserting the points 36 and 37 into the container body along the pairs of lines of perforation 21, 22 or 23, 24, in the manner illustrated in Figure 5. The knife edges 40 and 41 of the extensions will assist in the insertion of the attachment by severing the carton walls along the lines of perforation. Upon insertion of the extensions, the teeth 38 and 39 at the lower ends will engage the bottom closure of the container to prevent the accidental withdrawal of the trough, the teeth being angularly disposed so as to resist withdrawing movement of the attachment.

It will be noted that the inturned ledges 33 of the attachments underlie the container bottom to the outside and coact with the lower edges of the extensions to grip the container therebetween. In addition, the ledges serve as gutters to permit the drainage of water from the troughs. To this end I prefer to bow the ledges slightly so as to provide a slight gap centrally thereof between the ledges and the bottom of the container so that rain water falling into the troughs will drain downwardly and drip from the troughs in the manner illustrated by the arrow A in Figure 5. It will also be noted that the points 36 and 37 have shoulders, indicated at 42 (Figure 5) adapted to abut against the body walls of the container, thereby establishing the fully open position of the troughs. When the shoulders abut against the container body walls, the perch forming portions 31 of the attachments will be inclined outwardly and downwardly in the manner illustrated in the leftmost portion of Figure 5, thus permitting rain water striking the perches to drain therefrom in the manner illustrated by the arrow B and thereby preventing the rain water from running into the troughs.

As best seen in Figure 7, it is also contemplated that the inclined roof portions 11 and 12 will be disposed at right angles with respect to the trough carrying walls of the container body so that rain striking the roof portions will flow away from the troughs rather than into them, which would be the case if the troughs were associated with body walls 1 and 3. It is also contemplated that circular perforations, such as the perforations 43 may be provided in one or more of the container body walls which may be removed after a portion of the feed or grain has been used, thereby permitting small birds to enter the container and feed from the top of the remaining supply of grain or feed.

Modifications may, of course, be made in my invention without departing from the spirit of it. Having, however, described my invention in an exemplary embodiment, what I desire to secure and protect by Letters Patent is:

1. For use with a paperboard feed container adapted to be converted into a feeder, a trough attachment comprising a body member terminating at its lower end in an inturned ledge and at its upper end in an outturned perch, inwardly directed extensions on the ends of said body member, said extensions having upwardly directed points for puncturing the walls of the container with which the attachment is used, the lower edges of said extensions having teeth therein for engagement with the bottom of the container, said extensions being adapted to coact with said inturned ledge to grip the bottom of the container therebetween.

2. For use with a paperboard feed container adapted to be converted into a feeder, a trough attachment comprising a body member terminating at its lower end in an inturned ledge and at its upper end in an outturned perch, inwardly directed extensions on the ends of said body member, said extensions having upwardly directed points for puncturing the walls of the container with which the attachment is to be used, the front edges of said extensions comprising knife-like edges for cutting extension receiving slots in the container, the lower edges of the extensions having teeth therein for engagement with the bottom of the container, said extensions being adapted to coact with said inturned ledge to grip the bottom of the container therebetween.

3. For use with a paperboard feed container adapted to be converted into a feeder, a trough attachment comprising a body member terminating at its lower end in an inturned ledge and at its upper end in an outturned perch, inwardly directed extensions on the ends of said body member, said extensions having upwardly directed points for puncturing the walls of the container with which the attachment is to be used, the lower edges of the extensions having teeth therein for engagement with the bottom of the container, said extensions being adapted to coact with said inturned ledge to grip the bottom of the container therebetween, said inturned ledge being adapted to contact the bottom of the container and having a deflected area therein of a size sufficient to permit water to drain from the trough between the bottom of the container and the deflected portion of said ledge.

4. For use with a paperboard feed container adapted to be converted into a feeder, a trough attachment comprising a body member terminating at its lower end in an inturned ledge and at its upper end in an outturned perch, inwardly directed extensions on the ends of said body member, said extensions having upwardly directed points for puncturing the walls of the container with which the attachment is to be used, the lower edges of said extensions having teeth therein for engagement with the bottom of the container, said extensions being adapted to coact with said inturned ledge to grip the bottom of the container therebetween, said extensions including shoulders adapted to abut against the inner surface of the wall of the container with which said attachment is associated, said perch being inclined outwardly and downwardly when said shoulders are in abutting relation to the said container wall, whereby rain water collected on said perch will drain away from the body member of said attachment.

5. In a combined container and feeder, a tubular paperboard container having opposed pairs of body walls, a bottom and a top, tear tabs formed in a first pair of said opposed body walls adjacent the bottom edges thereof for forming contents dispensing openings, said tear tabs terminating short of the side edges of the said body walls, vertically disposed lines of perforation in said body walls between the ends of said tear tabs and side edges of said body walls, and a pair of trough attachments for engagement with the last named walls of the container, said attachments each comprising a body member terminating at its lower end in an inturned ledge and at its upper end in an outturned perch, inwardly directed extensions on the ends of said body member, said extensions having upwardly directed points for puncturing the lines of perforation in the said body walls, the lower edges of said extensions having teeth formed therein for engagement with the bottom of the container, said extensions being adapted to coact with said inturned ledge to grip the bottom of the container therebetween when the said extensions are inserted in the lines of perforation in the container body walls.

6. The combined container and feeder claimed in claim 5 wherein the top of said container includes a pair of inclined roof forming members the outer edges of which are connected to the upper edges of the remaining pair of opposed body walls, whereby rain water striking said roof forming members will be diverted away from said trough attachment.

7. The combined container and feeder claimed in claim 5 wherein said container bottom includes a medially scored inner bottom panel arranged to slope downwardly from the center line of the container toward the tear out tabs, whereby the contents of the container will be directed toward the contents dispensing openings defined by said tear tabs.

8. A trough attachment for the purposes described comprising a body member terminating at its lower end in an inturned ledge, inwardly directed extensions on the ends of said body member, said extensions having upwardly directed portions for engaging the walls of a container with which the attachment is used, the lower edges of said extensions having teeth therein for engagement with the bottom of the container, said extensions being adapted to coact with said inturned ledge to grip the bottom of the container therebetween.

References Cited in the file of this patent

UNITED STATES PATENTS

| 1,951,515 | Lyell | Mar. 20, 1934 |
| 2,340,976 | Nevins | Feb. 8, 1944 |
| 2,556,707 | Rendall et al. | June 12, 1951 |